2 Sheets—Sheet 1.

G. S. PICKETT.
POTATO-DIGGER, MARKER AND CULTIVATOR.

No. 187,772. Patented Feb. 27, 1877.

Witnesses:
C. Clarence Poole
R. D. O. Smith

Inventor:
George S. Pickett
per G. B. Woodruff
Attorney.

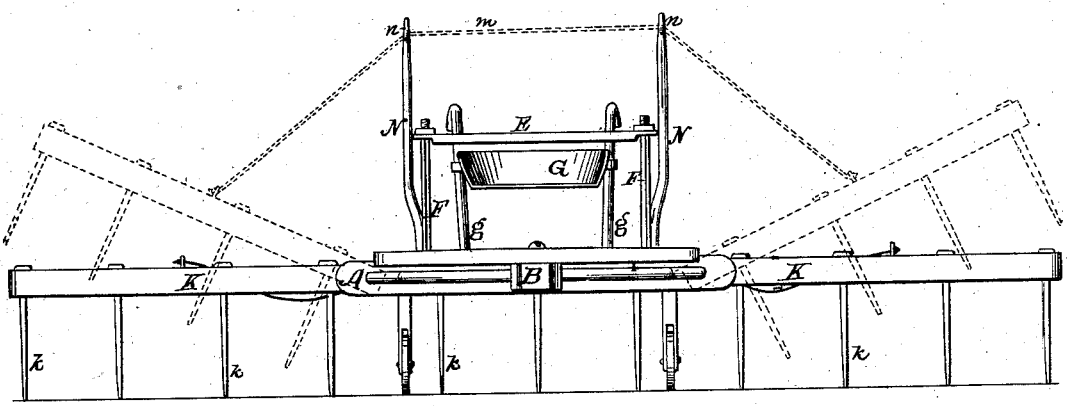
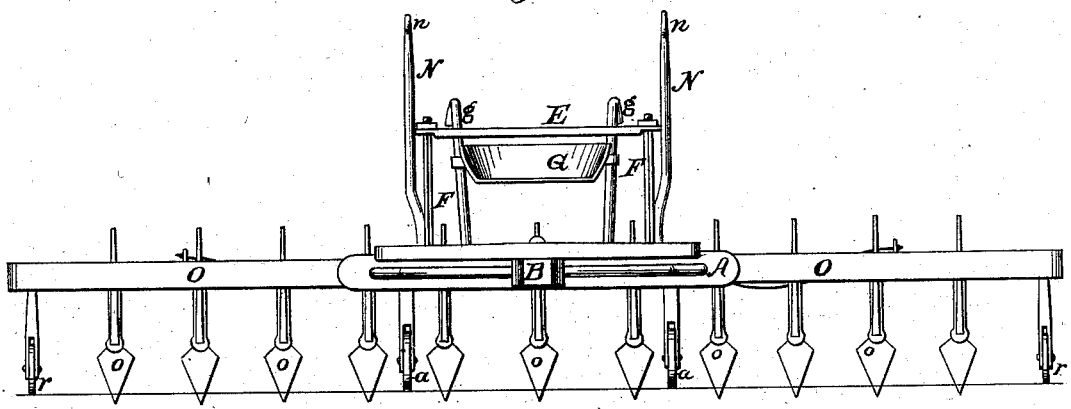

UNITED STATES PATENT OFFICE.

GEORGE S. PICKETT, OF PAOLI, WISCONSIN.

IMPROVEMENT IN POTATO DIGGER, MARKER, AND CULTIVATOR.

Specification forming part of Letters Patent No. 187,772, dated February 27, 1877; application filed January 3, 1877.

*To all whom it may concern:*

Be it known that I, GEORGE S. PICKETT, of Paoli, in the county of Dane and State of Wisconsin, have invented certain new and useful Improvements in Potato-Diggers, with Marker, Planter, and Cultivator Attachments; and that the following is a full, clear, and exact description of the same, reference being had to the accompanying drawings, making a part of this specification, in which—

Figure 1:
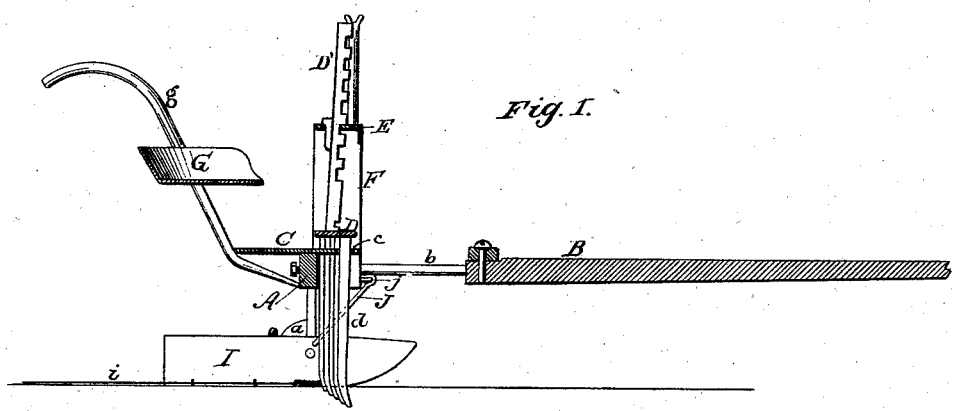
Figure 2:
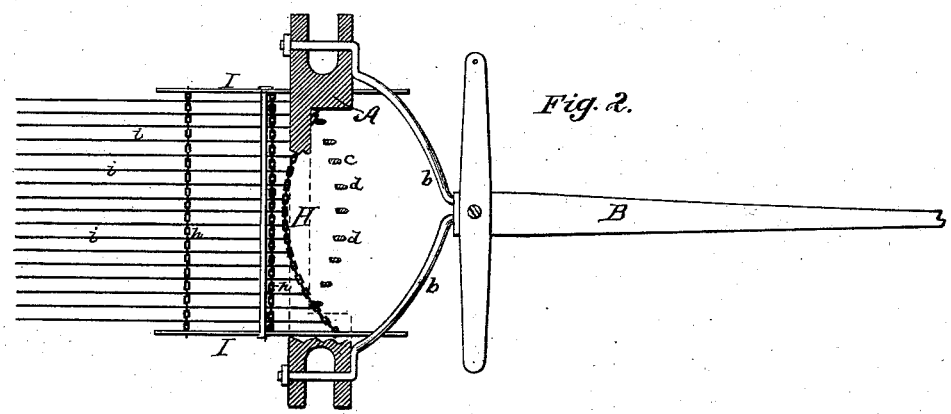
Figure 3:
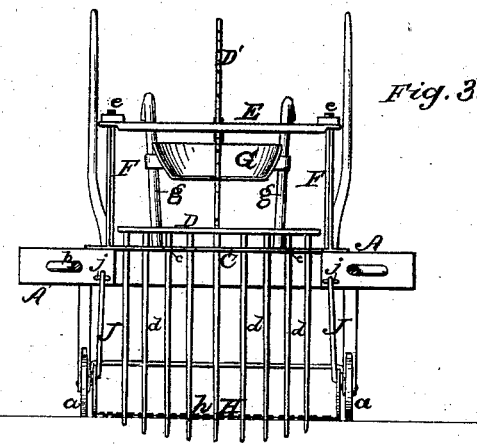

Figure 1, Plate I, represents a sectional side elevation through the center of the potato-digger, showing the device for adjusting the depth of the prongs, &c. Fig. 2 is a plan or top view of the potato-digger, showing the chain and rod separator, through a broken-off section of the bar or frame. Fig. 3 shows a front elevation of the same, with the tongue or pole left off. Fig. 4, Plate II, shows a front view of the potato-digger frame, with all of the digging apparatus removed, and arms attached to the frame, extending right and left, with marker-points for uniformly laying off the rows for the potatoes to be planted in. Fig. 5 is a view of the same, showing instead of the marker-points, a series of planter and cultivator blades for covering and cultivating the potato crop. Fig. 6 shows a sectional edge view of one of the cultivator blades and brace, and the manner of securing them to the arm or timber.

The object of my invention is to have a less number of distinct agricultural implements, many of which can be used only in their season from one to three weeks, and the remaining portion of the year are obliged to be housed or left to damage and decay by exposure.

My invention consists in the construction of a simple, cheap, and efficient potato-digger, with a marker, planter, and cultivator attachment, so arranged that the parts or devices to perform either function can easily be detached, and the one required in its season be attached, either one operating equally well, as though it were a separate and complete implement of itself.

To enable others to make and use my improved potato-digger, and the attachments for other purposes, I will describe it more in detail, referring to the drawings, and the letters marked thereon.

The frame-work of my improved potato-digger consists of one piece of hard wood or timber, A, of suitable size, and about three feet, more or less, in length, as may be desired, the same being supported at a suitable height from the ground on wheels $a\,a$. To the timber A, by the metal braces $b\,b$, the tongue or pole B is secured, to hold it in position. The digging device, which is secured to the top of the timber A, consists of a metal plate, C, in which are a series of holes, $c\,c\,c$, made in the arc of a circle, for the digging prongs or tines $d\,d$ to move up and down in, as they are adjusted to a suitable depth, and secured in place by the notched bar D′, extending up from the head of the piece D that holds the tines $d\,d$ together, through the metal bar E, the bar or piece forming the top of the frame, and is secured to the upright pieces F F by screws and nuts $e\,e$, so that it can easily be removed to take out the tines $d\,d$, when required. To the rear of the timber A and the plate C or platform the driver's seat G and handles $g\,g$ are firmly secured.

The device for receiving and cleaning the potatoes as they are loosened up with the soil by the tines $d\,d$ is made of the chain H, curved backward for the front, and the chains $h\,h$ in its rear, to which are attached a series of longitudinal rods, $i\,i\,i$, running or extending back under the frame and seat G, the chains H and $h\,h$ having their ends secured to the metal side boards or runners I I, they forming the guides to conduct the potatoes onto the chain and wire-rod screen, where they are entirely freed from the dirt, and left on the smooth surface to be gathered up. To the guides or runners I I are attached chains or link-rods J J, they being hooked into staples $j\,j$ in the timber A, in such manner that the screen can conform to the irregularities of the ground, and be easily taken off when the tines are removed from the frame, leaving it in the proper condition to attach any of the other parts, for the purposes before mentioned, and shown in the drawings on the plate II.

For marking and laying off parallel rows for planting, I attach to both ends of the piece or timber A arms K K, having inserted in them at suitable intervals a series of long spikes or harrow-teeth, $k\,k$, the arms being of about the same length as the piece A, so that three or more rows will be marked at a time.

The teeth $k\ k$ may be so distributed in the series of holes in the arms K K and piece A as to give any desired space between the rows, the arms being pivoted to the center portion, so that they may be lifted up off the soil when turning round, and held up at any time by the chain or cord $m$ being placed in the forks $n\ n$ on top of the standards N N, provided for that purpose, as seen in Fig. 4.

For covering the seed in planting, and for cultivating the crop, the arms K K are removed, and similar arms O O are inserted, they being provided with a series of cultivator-blades, $o\ o$, with rear braces P P, so fitted into the arms O that they can be adjusted, and held by the set-screws $q\ q$, the outer ends of the arms O O being supported on rollers $r\ r$, similar to the rollers $a\ a$ under the central frame A, thus making the main portion of the implement to perform the several required functions.

What I claim as my invention, and desire to secure by Letters Patent, is—

1. The cross-supporting chains H and $h\ h$, the series of rods $i\ i\ i$, and the guides I I, the same forming a screen to separate the potatoes from the soil, as herein set forth.

2. In combination with the separator, consisting of the chains, rods, and guides, as described, the series of prongs $d\ d$, adjustable bar D′, and perforated plate C, substantially as and for the purpose specified.

3. In combination with the frame A and platform C, the handles $g\ g$, and seat G, supported between the handles, substantially as herein shown and described.

4. The frame A having open ends or slots, and provided with perforated plate C, posts F F, cross-bar E, and standards N N, with forks $n\ n$, whereby the machine is adapted to be used as a potato-digger, cultivator, or land-marker, substantially as and for the purposes herein set forth.

In testimony whereof I hereunto subscribe my name to the above specification for improvement in potato-diggers.

GEORGE S. PICKETT.

Witnesses:
J. B. WOODRUFF,
J. FRED. KELLEY.